United States Patent [19]

Michel

[11] Patent Number: 4,520,840

[45] Date of Patent: Jun. 4, 1985

[54] HYDROPNEUMATIC ENERGY RESERVOIR FOR ACCUMULATING THE BRAKING ENERGY RECOVERED ON A VEHICLE

[75] Inventor: Robert Michel, Paris, France

[73] Assignee: Renault Vehicules Industriels, Lyons, France

[21] Appl. No.: 513,138

[22] Filed: Jul. 12, 1983

[30] Foreign Application Priority Data

Jul. 16, 1982 [FR] France .................... 82 12517

[51] Int. Cl.³ .............................................. F17C 1/00
[52] U.S. Cl. .................... 137/259; 137/264; 137/266; 138/30; 138/26; 220/855; 220/465; 220/23.2
[58] Field of Search ............... 138/30, 31, 26; 60/413, 60/414, 415, 416; 137/264, 259, 255, 262, 263, 266, 267; 180/165; 220/85 S, 465, 23.2

[56] References Cited

U.S. PATENT DOCUMENTS

| 194,217 | 8/1877 | Bushnell | 220/3 |
|---|---|---|---|
| 339,885 | 4/1886 | Hill | 220/3 |
| 846,266 | 3/1907 | Von Philp | 138/31 |
| 1,692,670 | 11/1928 | Le Mesurier | 220/3 |
| 2,331,921 | 1/1951 | Mercier | 138/30 |
| 4,062,356 | 12/1977 | Merrifield | 137/266 |
| 4,098,144 | 7/1978 | Besel et al. | 60/416 |
| 4,441,573 | 4/1984 | Carmau et al. | 60/413 |

FOREIGN PATENT DOCUMENTS

| 2613596 | 3/1976 | Fed. Rep. of Germany | 60/416 |
|---|---|---|---|
| 3031232 | 3/1982 | Fed. Rep. of Germany | 60/416 |

*Primary Examiner*—Martin P. Schwadron
*Assistant Examiner*—John S. Starsiak, Jr.
*Attorney, Agent, or Firm*—Beveridge, DeGrandi & Weilacher

[57] ABSTRACT

Hydropneumatic energy reservoir for accumulating the braking energy recovered on a vehicle by means of a hydrostatic energy recovery-restoration device, combined or not with the vehicle transmission and working between a high-pressure accumulator and a low-pressure accumulator, characterized in that it comprises several oblong cylindrical hydropneumatic accumulators (1) connected hydraulically in parallel and placed side by side inside a single casing (6) of small height, the space included between the said casing (6) and the said accumulators (1) forming the low-pressure accumulator (16).

4 Claims, 3 Drawing Figures

HYDROPNEUMATIC ENERGY RESERVOIR FOR ACCUMULATING THE BRAKING ENERGY RECOVERED ON A VEHICLE

The invention relates essentially to the recovery of braking energy on vehicles, in particular on city vehicles called on to make frequent stops, like buses or delivery vehicles.

In this type of recovery system the recovered energy is normally accumulated in flywheel accumulators, in electrochemical batteries or, even more recently, in hydropneumatic accumulators. The latter are of known technology and in comparison with the other recovery and accumulation modes they are flexible in use, notably in connection with the continuous transmission to which they are connected. On the other hand they remain less efficient in terms of mass and volume and consequently raise serious problems for fitting onto vehicles.

Indeed, in addition to penalizing the energy savings obtained, these problems of dead weight and bulk lead to high costs linked either with the accumulator itself or, mainly, with the modifications that have to be made to the vehicle to fit the accumulator.

The result is that vehicles thus equipped are no longer standard in any way and are therefore much more expensive to produce and maintain and that, furthermore, the equipment used for this installation cannot be transposed to another vehicle or modulated in size, which increases the overall cost of this installation.

The purpose of the invention is to eliminate the above drawbacks by making a compact assembly combining all the accumulation functions and capable of being fitted without any substantial modification to various types of series-produced standard vehicles equipped with the hydrostatic elements designed for charging and discharging the accumulator.

The invention consists basically in grouping several oblong cylindrical hydropneumatic accumulator units of known type placed side by side inside a single casing or envelope having roughly the same length as the units, an average width and a small height, the high-pressure accumulator units being connected in parallel to make up a single high-pressure accumulator, whilst the space between this and the casing forms a low-pressure accumulator; the high-pressure units are moveover suspended in the casing by their mouth and their tail end, whilst the single casing linking the hydraulic connection nozzles consists of a self-supporting assembly mounted on cushioning means so that it can be easily installed on a horizontal surface of the vehicle, in particular on the vehicle roof, without necessitating any conversions other than fitting the connecting lines.

The low-pressure reservoir part can be open to the atmosphere or at low pressure without a separating diaphragm, and, in particular, the position on the roof makes it possible quite naturally to feed, under pressure the feed pump of the transmission-recovery system.

Other features of the invention will appear from the following description of an embodiment taken as an example and shown in the appended drawings, in which.

Figure 1:
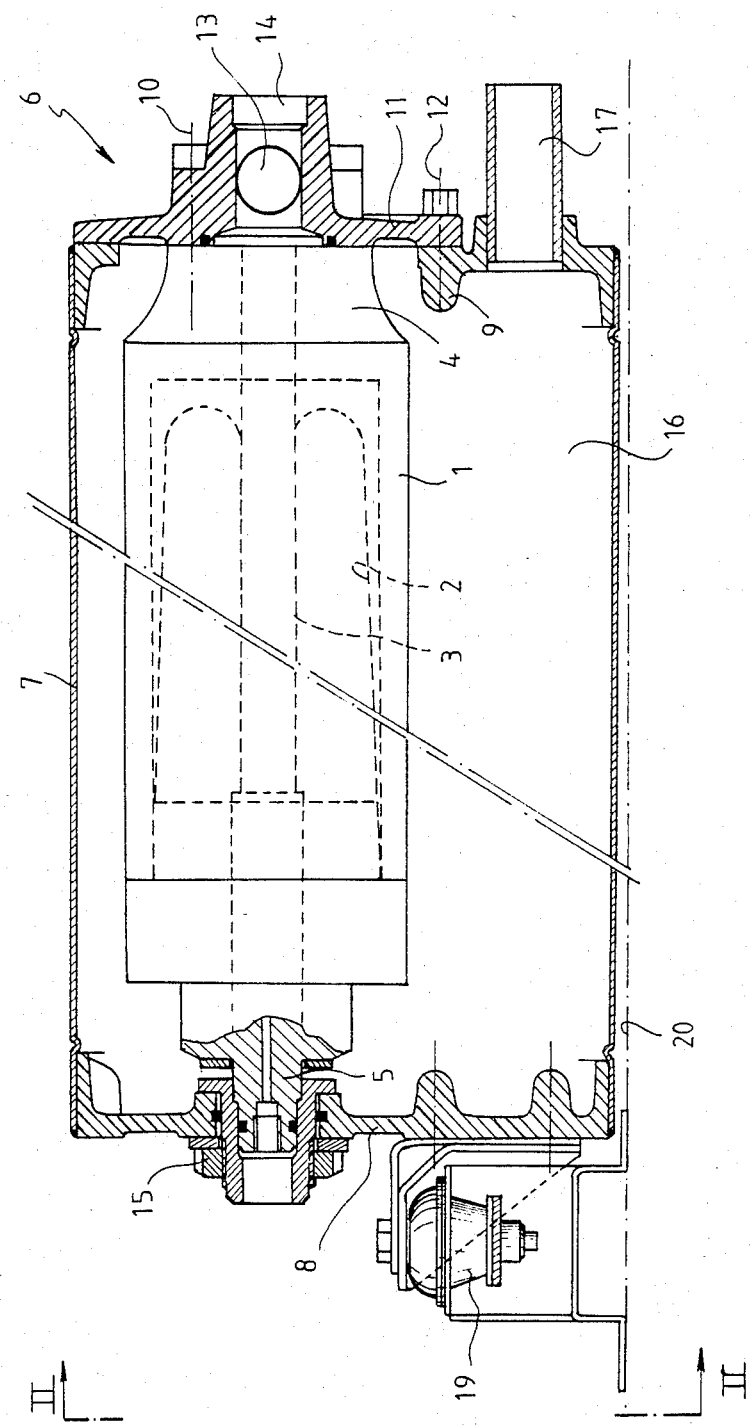
FIG. 1 is a longitudinal section view of the whole assembly.
Figure 2:
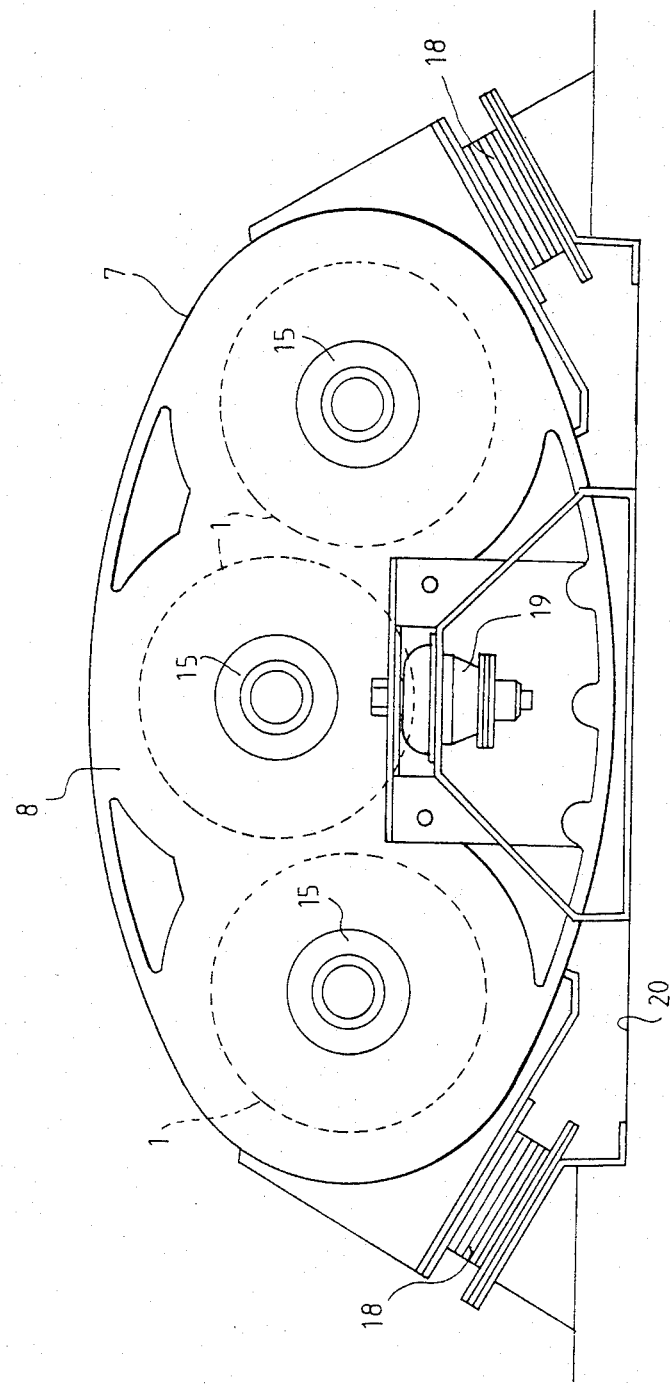
FIG. 2 is an end view along II—II of FIG. 1.

In the particular embodiment example three Leduc type precharged high-pressure accumulator units 1 are used with an inner tubular bladder 2 surrounding a central tie rod 3 which runs from the mouth of the hydraulic connection 4 to the tail 5 fitted with an inflation and internal nitrogen pressure check plug.

These three accumulators 1 are very long, about 2 m, and small diameter and, according to the invention, are placed side by side inside a single casing 6 consisting of a sheet steel shell 7, roughly oval in cross-section, closed by two endplates 8 and 9, made of cast aluminium for example, which are welded onto the shell 7.

In order to permit the various accumulators 1 to be installed and dismantled the three accumulators are fixed by means of screws 10 on a single cover 11 itself fixed by means of screws 12 to the back endplate 9, so that this single cover 11 also forms the manifold connecting the three mouths 4 in parallel by means of transverse ducts 13 leading to the single high-pressure connection nozzle 14.

At the other end the tail 5 of each accumulator 1 is sealingly inserted into a nozzle 15 fixed on the front endplate 8 and providing access to the inflation and check nozzle.

According to the invention the space 16 contained between the casing 7 and the three high-pressure accumulators 1 makes up the low-pressure accumulator connected to the low-pressure connection nozzle 17.

The various high-pressure accumulators 1 being thus fixed and suspended from both their ends inside the casing 6, this forms a rigid self-supporting unit which is also mounted on three cushioning means, two side ones 18 near the back endplate 9, and one end 19 located in the centre in front of the front endplate 8.

The compact assembly thus formed, which is a little longer than 2 m, 0.78 m wide and 0.43 m high and which weighs about 700 kg in working order, can be fixed in one piece in any position on the vehicle, but preferably on the roof 20 of the vehicle in the case of a bus or a sheet-metal clad van. The conversion of the vehicle is thus limited to fitting two lines from the nozzles 14 and 17 to the hydrostatic devices of the recovery transmission system.

Figure 3:
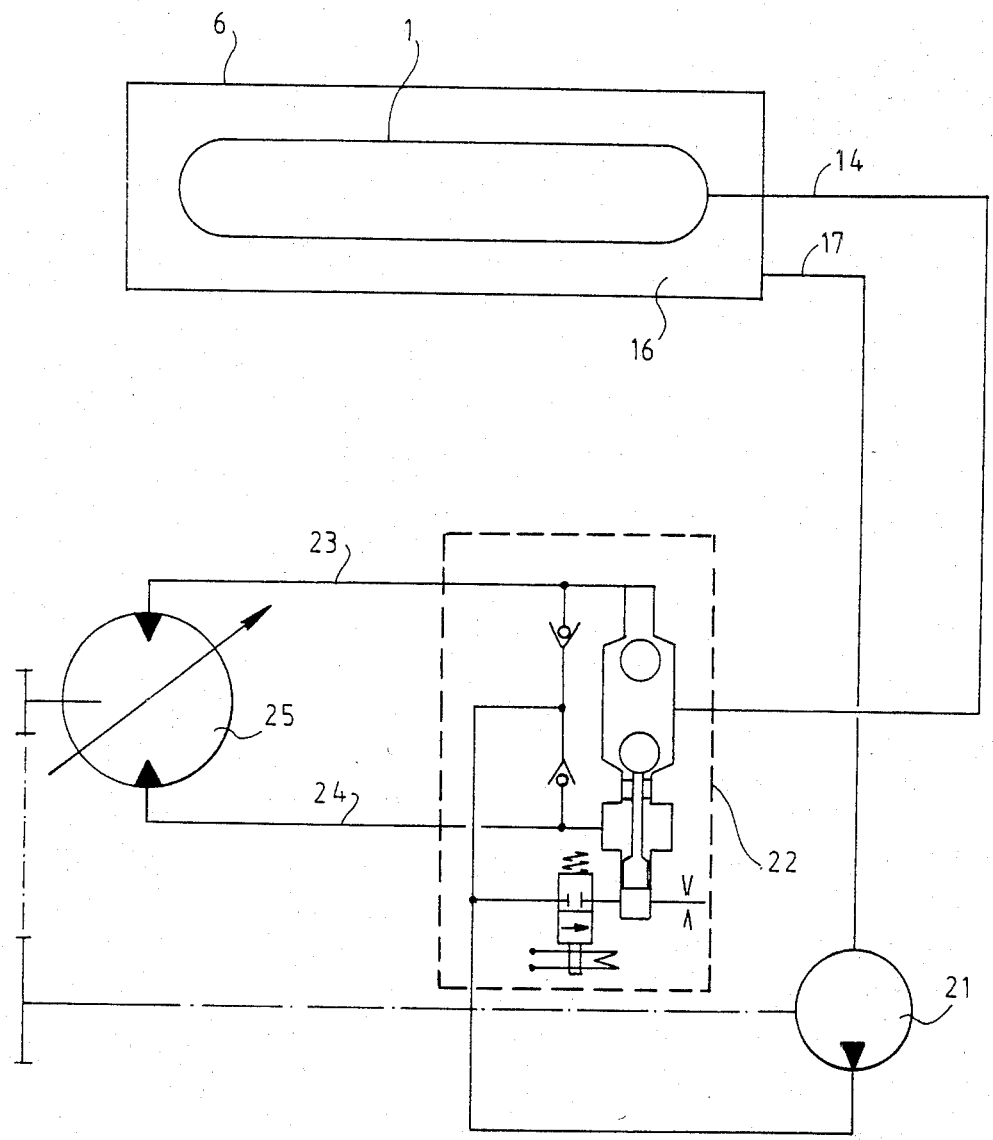
FIG. 3 is a hydraulic connection diagram.

As an example, as shown in FIG. 3, the low-pressure line 17 feeds the feed pump 21 located on the lower level of the vehicle, so that pressurization of this line, owing to the position on the vehicle roof 20, is particularly favourable. The high-pressure pipe 14 is connected to a check valve unit 22 which provides alternate connection with one or the other of the input/output 23 and 24 of a hydraulic machine 25 for energy recovery-restoration connected to the transmission. This is in the case of the machine 25 being of a type without piston displacement reversal (or "two-quadrant" type). Such a cheek valve unit 22 may be unnecessary if, on the contrary, a machine with piston displacement reversal (or "four-quadrant" type) is used for the machine 25.

In addition the hydraulic recovery-restoration machine 25 is itself replaced by other machines if use is made of the device described elsewhere in French patent application No. 82 08 855 in the applicant's name.

In all cases, and in particular when being installed on the vehicle roof, the low-pressure reservoir 16 can be opened to the atmosphere by means of a breather or again can be maintained at low pressure without requiring an air/oil separating diaphragm.

Naturally, any other type of high-pressure accumulator 1 than the Leduc type given as an example could be used, for example an unprecharged accumulator with an inside bladder, with the suspension continuing to be provided at the back by the mouth and on the front side by any suitable means, if necessary by a cup fixed on the front endplate 8 of the inner side and which serves to locate the reservoir body 1 in it.

In addition to the compact, preassembled and self-supporting aspect of the reservoir assembly according to the invention, this assembly may have standard dimensions and capacity suiting a large number of vehicle types, but it is also possible to provide for different capacity values by modifying the length of the casing 7 as well as of the reservoirs 1, only, i.e. without much altering the standards and tooling. Another way of adapting the capacity consists simply in removing some of the accumulators 1 so as to change the number thereof.

I claim:

1. A combined high pressure-low pressure hydraulic accumulator for a vehicle, said accumulator combining a high pressure hydraulic accumulator located in a casing, and a low pressure hydraulic accumulator comprising the space between said high pressure accumulator and said casing, wherein said high pressure hydraulic accumulator comprises several bodies, each including a tubular wall, an hydraulic end at an end of said wall with a fitting for hydraulic connection, a pneumatic end at the other end of said wall with a valve and a pneumatic connection for precharging air pressure in said body and checking said pressure, a tie-rod axially located in said body and prestrained between both ends to press said hydraulic end and said pneumatic end toward said wall, and a tubular bladder surrounding said tie-rod and tightly connected to said wall at the vicinity of said pneumatic end and to said tie-rod at the vicinity of said hydraulic end;

said casing comprises a shell with a front end plate at an end thereof and a back end plate at another end thereof, said front end plate being provided with an aperture large enough for freely introducing and extracting all said several high pressure bodies at a time;

said bodies being all connected, each by said fitting of its hydraulic end, to a single member forming together a manifold for mechanically and hydraulically connecting all said hydraulic ends in parallel to a common high pressure input-output, and a cover for closing said aperture of said casing.

2. The hydraulic accumulator according to claim 1, wherein said pneumatic end of each of said bodies comprises a cylindrical tail extension, and said back endplate of said casing comprises cylindrical holes for each slidingly receiving and supporting one of said tail extension.

3. The hydraulic accumulator according to claim 2, wherein said pneumatic connection of each of said pneumatic ends is located in the axis of said cylindrical tail extension, and each of said holes of said back endplate is a through passing hole, at least one of said hole and tail extension comprising a sliding ring for tightness.

4. The hydraulic accumulator according to claim 2 further comprising said high pressure-low pressure hydraulic accumulators being a self-supporting unit with supporting feet and resilient cushions under these feet.

* * * * *